(12) United States Patent
Rosman et al.

(10) Patent No.: US 11,401,024 B2
(45) Date of Patent: Aug. 2, 2022

(54) FUSELAGE SECTIONS HAVING TAPERED WING RIB INTERFACES

(71) Applicant: The Boeing Company, Chicago, IL (US)

(72) Inventors: Richard R. Rosman, Seattle, WA (US); Kenneth D. Cominsky, Lake Stevens, WA (US); Branko Lakic, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 126 days.

(21) Appl. No.: 16/597,081

(22) Filed: Oct. 9, 2019

(65) Prior Publication Data

US 2021/0107619 A1    Apr. 15, 2021

(51) Int. Cl.
  *B64C 1/26*    (2006.01)
  *B64C 3/18*    (2006.01)

(52) U.S. Cl.
  CPC .............. *B64C 1/26* (2013.01); *B64C 3/187* (2013.01)

(58) Field of Classification Search
  CPC ............ B64C 1/26; B64C 3/187; B64C 3/185
  See application file for complete search history.

(56) References Cited

U.S. PATENT DOCUMENTS

| 2,162,227 A | 6/1939 | Page, Jr. |
| 4,030,688 A | 6/1977 | Pellarini |
| 2009/0321575 A1 | 12/2009 | Barroso Vloedgraven et al. |
| 2011/0089291 A1* | 4/2011 | Dietrich .................. B64C 1/064 244/120 |
| 2011/0147521 A1* | 6/2011 | Delahaye ................. B64C 1/26 244/119 |
| 2012/0286090 A1* | 11/2012 | Guittard ................... B64C 1/26 244/117 R |
| 2013/0233973 A1 | 9/2013 | Nordman et al. |
| 2019/0205501 A1 | 7/2019 | Vasquez et al. |

FOREIGN PATENT DOCUMENTS

| DE | 29806346 | 7/1999 |
| EP | 3415414 | 12/2018 |

OTHER PUBLICATIONS

European Patent Office, "Extended European Search Report," issued in connection with European Patent Application No. 20196891.4, dated Mar. 3, 2021, 11 pages.
European Patent Office, "Communication Pursuant to Article 94(3) EPC," dated Apr. 11, 2022 in connection with European Patent Application No. 20 196 891.4, 6 pages.

* cited by examiner

*Primary Examiner* — Richard R. Green
*Assistant Examiner* — Ashesh Dangol
(74) *Attorney, Agent, or Firm* — Hanley, Flight & Zimmerman

(57) ABSTRACT

Fuselage sections having tapered wing rib interfaces are disclosed. A disclosed example apparatus includes a rib associated with a fuselage section, and a wing interface surface defined by the rib, where the wing interface surface is tapered relative to a longitudinal axis of the fuselage section from an aft end of the fuselage section to a fore end of the fuselage section.

24 Claims, 9 Drawing Sheets

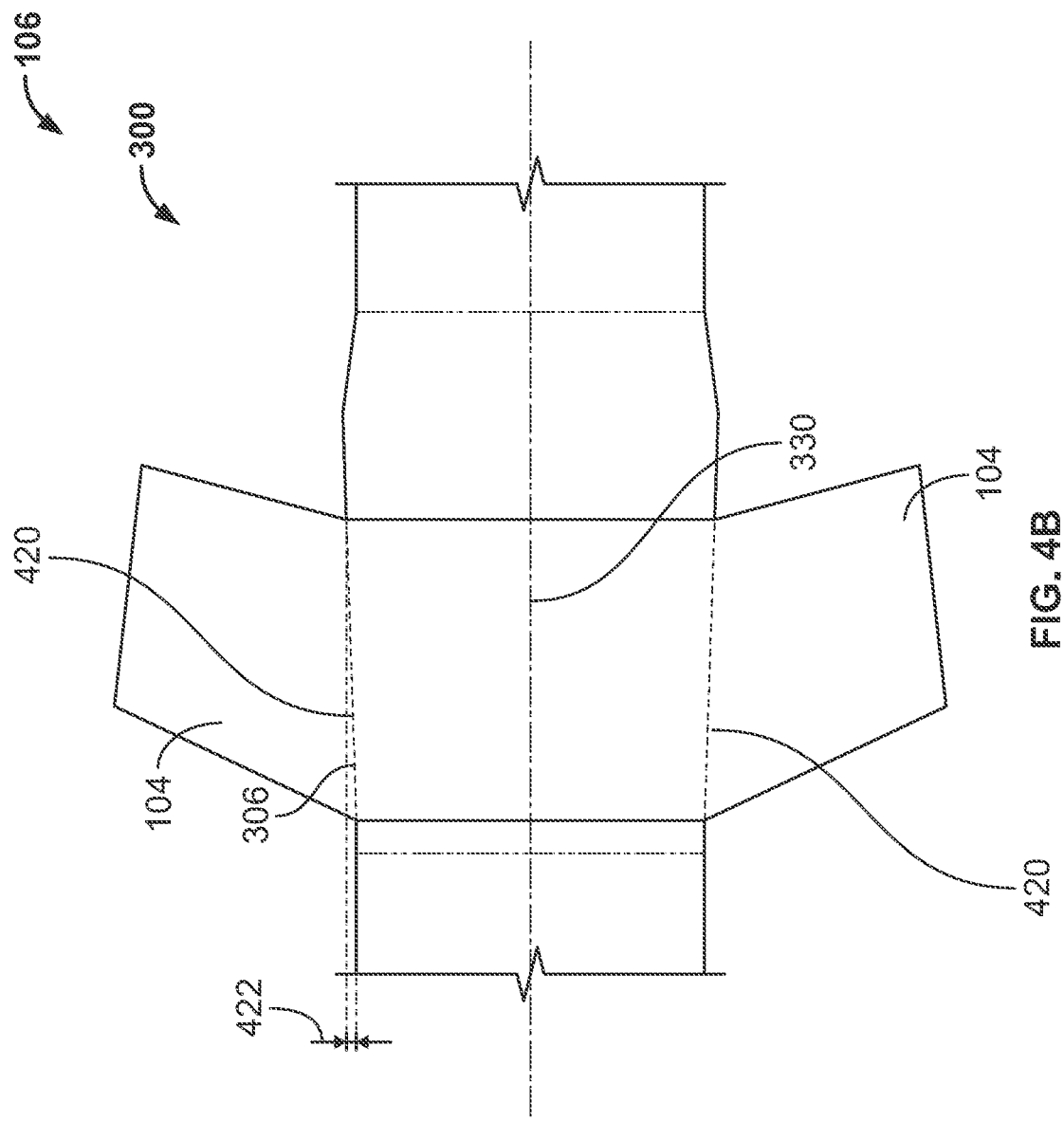

US 11,401,024 B2

FUSELAGE SECTIONS HAVING TAPERED WING RIB INTERFACES

FIELD OF THE DISCLOSURE

This disclosure relates generally to aircraft and, more particularly, to fuselage sections having tapered wing rib interfaces.

BACKGROUND

Multiple fuselage sections (e.g., fuselage joint sections, cylindrical sections, etc.) are typically joined together to define a fuselage. Some fuselage sections that are interspersed between other fuselage sections are used to mount and support an aerodynamic structure, such as a wing of an aircraft. In particular, a rib (e.g., a wing joint, a support rib) is typically located within a wing box to extend between forward and aft wing spars. The rib is implemented to couple an outer wing box to a separate center wing box. Further, the rib is coupled to a fuselage monocoque and used to transmit significant vertical wing loads toward the fuselage. Accordingly, a skin of the fuselage monocoque must generally align with the wing rib to smoothly transmit vertical loads. To align and blend with the rib, the fuselage cross section typically generally exhibits a relatively flat portion proximate and above the wing. This relatively flat portion of the monocoque is then aligned with the wing rib.

However, relative positioning and support of the wing by the aforementioned flat portion can result in eccentric loading of the fuselage as a cross section corresponding to the flat portion transitions to a relatively round fuselage cross section. As a result, structural components are usually implemented to alleviate the eccentric loading, thereby resulting in increased costs, weight, and labor. Further, blending wing-to-fuselage surfaces and/or contours with the flat portion can result in relatively abrupt surface transitions that can cause unfavorable airflow characteristics (e.g. a relatively high drag coefficient) of the aircraft.

SUMMARY

An example apparatus includes a rib associated with a fuselage section, and a wing interface surface defined by the rib, where the wing interface surface is tapered relative to a longitudinal axis of the fuselage section from an aft end of the fuselage section to a fore end of the fuselage section.

An example fuselage section of an aircraft includes an outer surface to at least partially define an exterior of the aircraft, and a rib to support a wing, where the rib defines a wing interface surface that exhibits a taper, where the taper is angled inward relative to a longitudinal axis of the fuselage section and angled from an aft end of the fuselage section to a fore end of the fuselage section.

An example method of producing a fuselage section includes orienting a rib relative to a longitudinal axis of the fuselage section, where the rib is to be angled from the longitudinal axis to define a tapered wing interface to support a wing, and coupling the rib to the fuselage section.

BRIEF DESCRIPTION OF THE DRAWINGS

FIG. 4B is a load path overview of an example fuselage section of the fuselage construction of FIG. 3.

Figure 1:
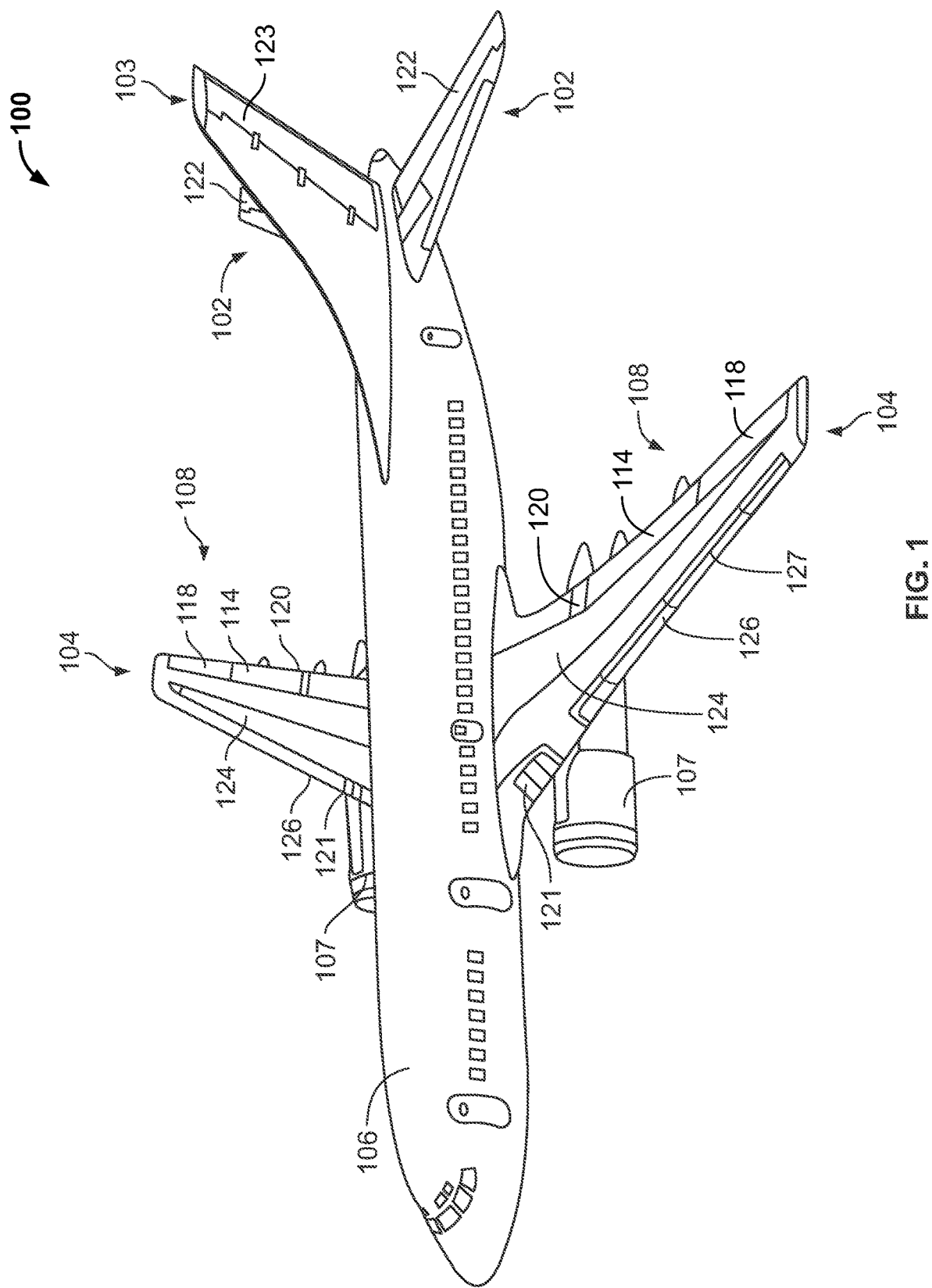
FIG. 1 illustrates an aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Fuselage sections having tapered wing rib interfaces are disclosed. Some known aircraft employ fuselage sections that are generally cylindrical in shape and assembled together to define a fuselage. Some of these known fuselage sections exhibit relatively flat side surfaces to provide structural and/or geometric transitions to other components coupled thereto. However, these flat side surfaces can cause bifurcations and/or geometric discontinuities with adjacent fuselage sections. As a result, undesirable flow characteristics, such as a relatively high drag coefficient, may be encountered. Further, a significant amount of strengthening parts can be necessitated to alleviate eccentric loading for such known fuselage sections.

Examples disclosed herein reduce and/or eliminate bifurcations between fuselage sections by implementing fuselage sections having a rib with a tapered wing rib interface (e.g., a wing rib interface surface) of a rib to enable smoother geometric and/or surface transitions, thereby improving overall aerodynamic characteristics of an aircraft (e.g., reducing a drag coefficient of the aircraft, etc.). Particularly, the rib is tapered inward toward a longitudinal axis of the fuselage section from an aft end of the fuselage section to a fore end of the fuselage section.

Examples disclosed herein also enable a relatively strong structural joint for an aerodynamic structure, such as a wing, for example. Accordingly, load paths can be improved by effectively distributing loads across the fuselage section. Particularly, eccentric loading can be reduced. In turn, because of the improved load distribution of examples disclosed herein, relatively light weight fuselage joints, as well as fewer and lighter reinforcing joint components, are enabled, thereby saving associated, weight, costs and labor.

In some examples, a taper angle of the wing rib interface is approximately 0.8 to 1.4 degrees (e.g., approximately 1.1 degrees). In some examples, a blended contour is implemented to transition the fuselage section to a wing and/or a rib supporting the wing. In some such examples, a blended contour is positioned in a space defined between the wing and an external surface of the fuselage section.

As used herein, the term "aerodynamic structure" refers to an outboard structure that extends from a body of a vehicle, such as an aircraft fuselage, for example. Accordingly, the term "aerodynamic structure" can refer to a wing, a horizontal tail, a vertical tail, etc. As used herein, the term "fuselage section" refers to a portion of a fuselage that is attached to other fuselage sections to define a fuselage. Accordingly, the term "fuselage section" can refer to cylindrical portions or sections that are adjoined to one another. As used herein the term "blended contour" refers to a component, device, assembly and/or application (e.g., a surface application, an applied material, etc.) that is used to defined curved and/or blended exterior surfaces/features between components.

FIG. 1 illustrates an example aircraft 100 in which examples disclosed herein can be implemented. In the illustrated example, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers. In some examples, the control surfaces 108 are operated (i.e., displaced) independently of one another. The example control surfaces 108 include trailing edge flaps (e.g., rotatable flaps) 114, ailerons 118, flaperons 120, leading edge Krueger flaps 121 and leading edge slats 127. In this example, the horizontal tails 102 include elevators 122 and the vertical tail 103 includes a rudder 123. The wings 104 also define upper and lower surfaces (e.g., upper and lower sides, upper and lower aerodynamic surfaces, etc.) 124, 126, respectively.

To control flight of the aircraft 100, the control surfaces 108 mounted to the wings 104 alter the lift and pitch of the aircraft 100. Accordingly, the control surfaces 108 of the illustrated example can transmit loads to and throughout the fuselage 106 as they are moved to direct movement of the aircraft 100. To strengthen fuselage joints of the aircraft 100 and improve aerodynamic characteristics thereof, examples disclosed herein may be applied to any portion of the fuselage 106 or any outboard structure extending from the fuselage 106.

Figure 2:
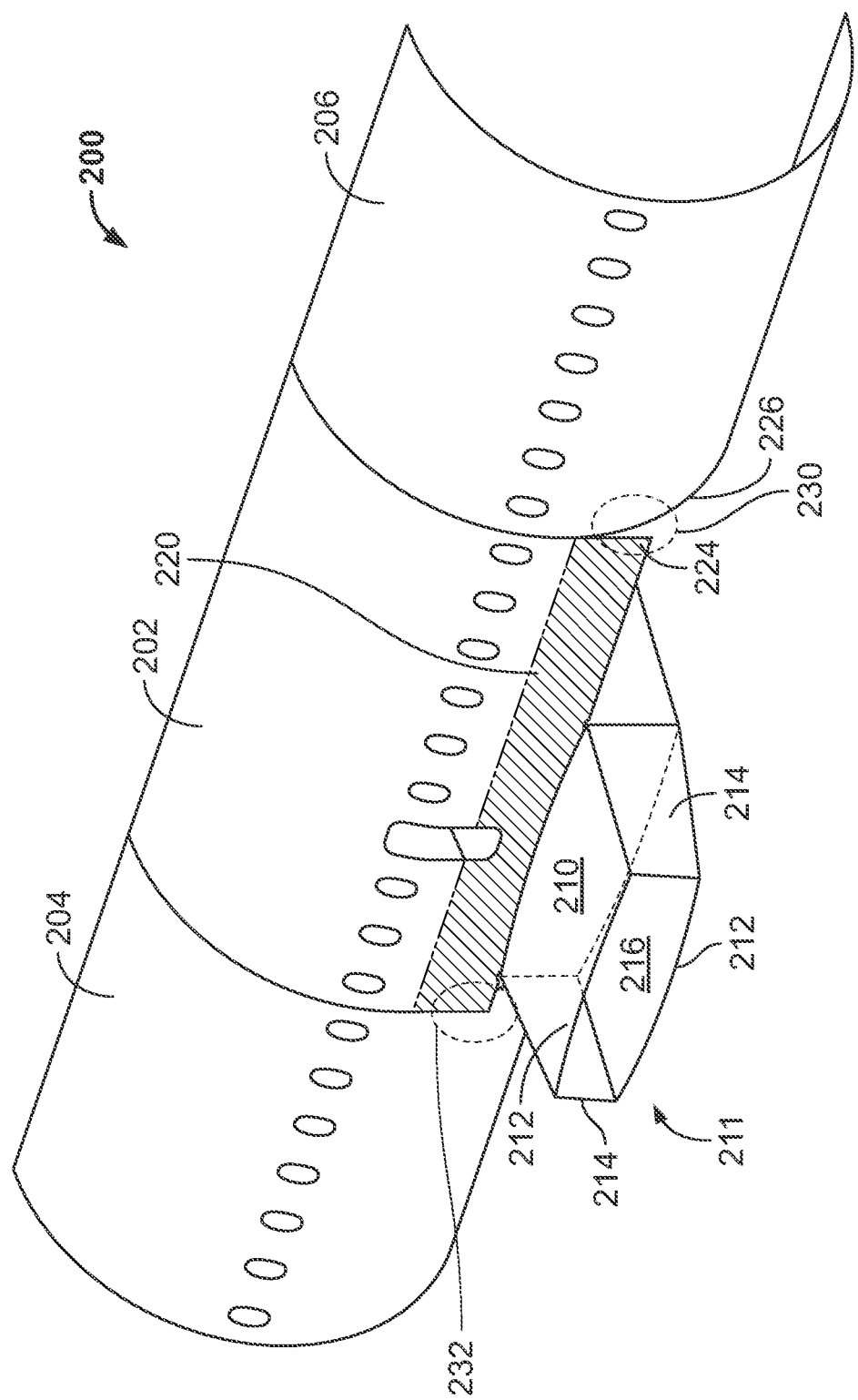
FIG. 2 depicts a known fuselage construction.

FIG. 2 depicts a known fuselage construction 200. In this known implementation, an intermediate fuselage portion or section 202 is positioned between fuselage sections 204, 206. In other words, the fuselage portion 202 is disposed between the fuselage sections 204, 206. Further, a support rib 210 of the fuselage section 202 supports and mounts a wing, such as the wing 104 shown in FIG. 1. The support rib (e.g., a support wall, a support surface, etc.) 210 is coupled to an outer wing box 211 that includes upper and lower surfaces 212, as well as fore and aft surfaces 214, all of which define an inner volume or cavity 216.

In this known implementation, the fuselage section 202 includes a relatively flat region 220 to define a surface/geometric transition from the wing to the support rib 210. The relatively flat region 220 includes an edge 224 while the fuselage section 206 includes an edge 226. The edges 224, 226 define a bifurcation 230, which can result in reduced aerodynamic efficiency and eccentric loading due to the relatively flat region 220. Similarly, a bifurcation 232 results between the fuselage section 202 and the fuselage section 204. Thus, numerous structural components to join the fuselage sections 202, 204, 206 with a requisite amount of strength can be necessitated.

In contrast, examples disclosed herein reduce (e.g., eliminate) the bifurcation 230 by utilizing a tapered wing rib interface of a fuselage section to define relatively smooth surface transitions, as well as reduce (e.g., eliminate) stresses due to discontinuities. Accordingly, in examples disclosed herein, eccentric loading between a fuselage section and an aerodynamic structure mounted to the fuselage section can be reduced. In turn, due to the increase in strength, relatively smaller and/or lighter components can be used instead, thereby reducing costs and labor typically associated with known fuselage section joints.

Figure 3:
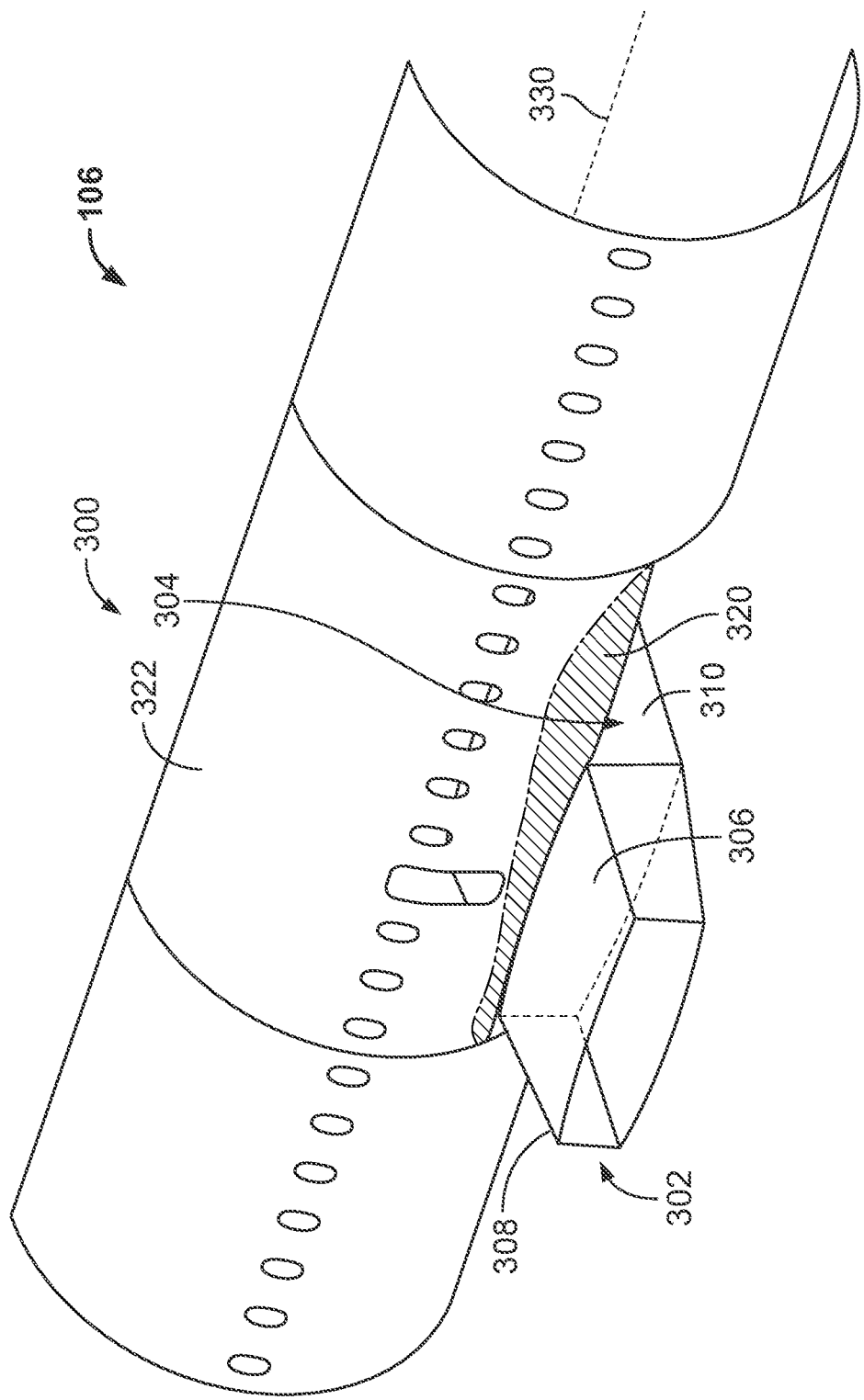
FIG. 3 depicts an example fuselage construction in accordance with teachings of this disclosure.

FIG. 3 is a perspective view of an example fuselage construction in accordance with teachings of this disclosure. In the illustrated example, a fuselage section (e.g., a fuselage portion, a cylindrical portion, etc.) 300 is shown. As can be seen in the illustrated example of FIG. 3, an outer wing box 302 and an inner wing box 304 are attached to the fuselage section 300 and, thus, the fuselage 106 via a fuselage monocoque. Further, the outer wing box 302 is attached to the inner wing box 304 at a rib (e.g., a rib surface, a wing interface surface, a rib wall, etc.) 306. In this example, the rib 306 extends between a fore wing spar (e.g., a front wing spar, a fore box spar) 308 and an aft wing spar 310. In other words, the rib 306 separates the fore wing spar 308 from the aft wing spar (e.g., a rear wing spar, an aft box spar) 310 along a longitudinal axis 330 of the fuselage section 300. Further, a blended contour 320 defines curved surface transitions between an outer surface 322 of the fuselage section 300 and the rib 306 and/or the wing 104 of FIG. 1.

In the illustrated example, the rib 306 defines a taper (e.g., a draft, etc.) and/or is tapered from an aft end of the fuselage section 300 to a fore end of the fuselage section 300. In other words, the rib 306 is angled relative to the longitudinal axis 330 of the fuselage section 300.

To at least partially define the fuselage 106, the fuselage section 300 is assembled and/or joined to a first adjacent fuselage section at the fore end and, additionally, to a second adjacent fuselage section at the aft end. Accordingly, the example fuselage section 300 acts as an intermediate section that is positioned between other fuselage sections to define the fuselage 106.

In contrast to the known relatively flat region 220 of FIG. 2, the fuselage section 300 exhibits smooth surface transitions of the blended contour 320. To blend an overall shape of the fuselage section 300 to an adjacent fuselage section, the blended contour 320 includes compound contours. In particular, the blended contour 320 is curved with a relatively complex geometry along multiple directions to substantially match adjacent surfaces of the adjacent fuselage section and reduce abrupt geometric transitions, thereby yielding significant aerodynamic advantages. As a result, a bifurcation between fuselage section 300 and an adjacent fuselage section is reduced (e.g., eliminated). In some examples, the blended contour 320 also provides additional load paths to effectively distribute loads across the fuselage section 300 and the fuselage 106. In this example, little or no relatively flat external surfaces are exhibited by the fuselage section 300.

Figure 4A:
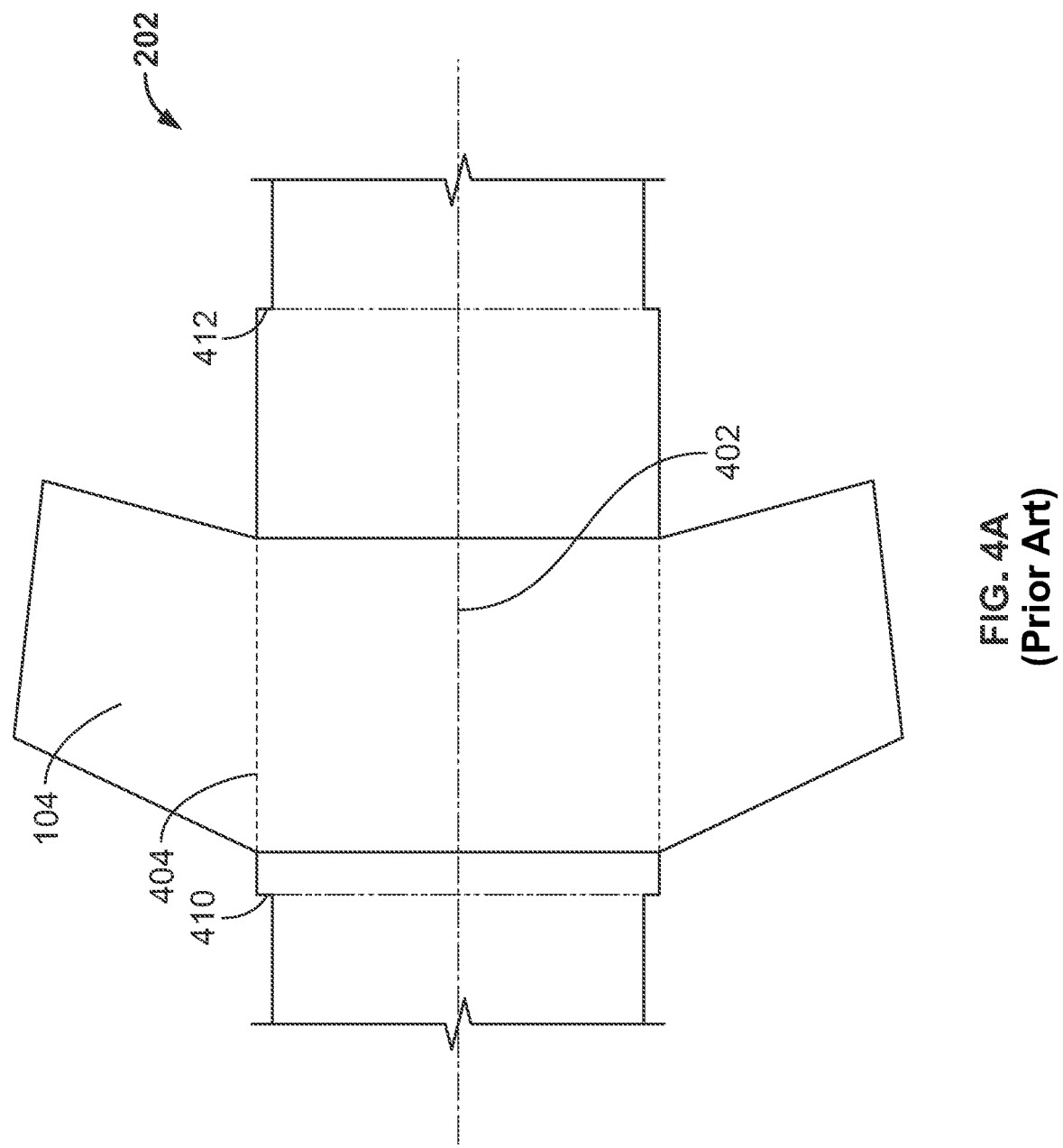
FIG. 4A is a load path overview of a fuselage section of the known fuselage construction of FIG. 2.

FIG. 4A is an overview of a load path of a known fuselage section, such as the fuselage section 202 shown in FIG. 2. As can be seen in FIG. 4A, a dotted line 402 represents a longitudinal axis (e.g., a longitudinal center) of the fuselage section 202 while a line 404 represents a wing interface surface between the wing 104 and the fuselage section 202. Accordingly, due to the geometries of this known implementation, geometric discontinuities 410, 412 can cause stress concentrations and/or eccentric loading.

FIG. 4B is an overview of an improved load path enabled by examples disclosed herein. In the illustrated view of FIG. 4B, the wings 104 extend from the fuselage section 300. Accordingly, dotted lines 420 represent a wing interface surface defined by an inward taper of the rib 306 relative to the longitudinal axis 330. As a result, load paths are introduced that can reduce (e.g., eliminate) eccentric loading related to the fuselage 106 and, additionally, can reduce secondary loads encountered by the fuselage 106 and/or the wings 104.

To reduce (e.g., eliminate) eccentric loading resulting from forces acting on each of the wings 104 and/or loads transferred between a fore end and an aft end of the fuselage section 300, the taper of the rib 306 defines smooth and a continuous load paths for the fuselage section 300. In particular, twisting and load generation at geometric discontinuities are greatly reduced. As can be seen in the illustrated example, an angle of the taper (i.e., a taper angle) is generally depicted by double arrows 422. Accordingly, as used herein, a taper angle generally refers to an inward convergence of at least a portion (e.g., a wall, a surface, etc.) of the rib 306 relative to the longitudinal axis 330. In this example, an entire length of the rib 306 exhibits the aforementioned taper. However, in other examples, the taper can extend along only a portion of the length of the rib 306.

Figure 5A:
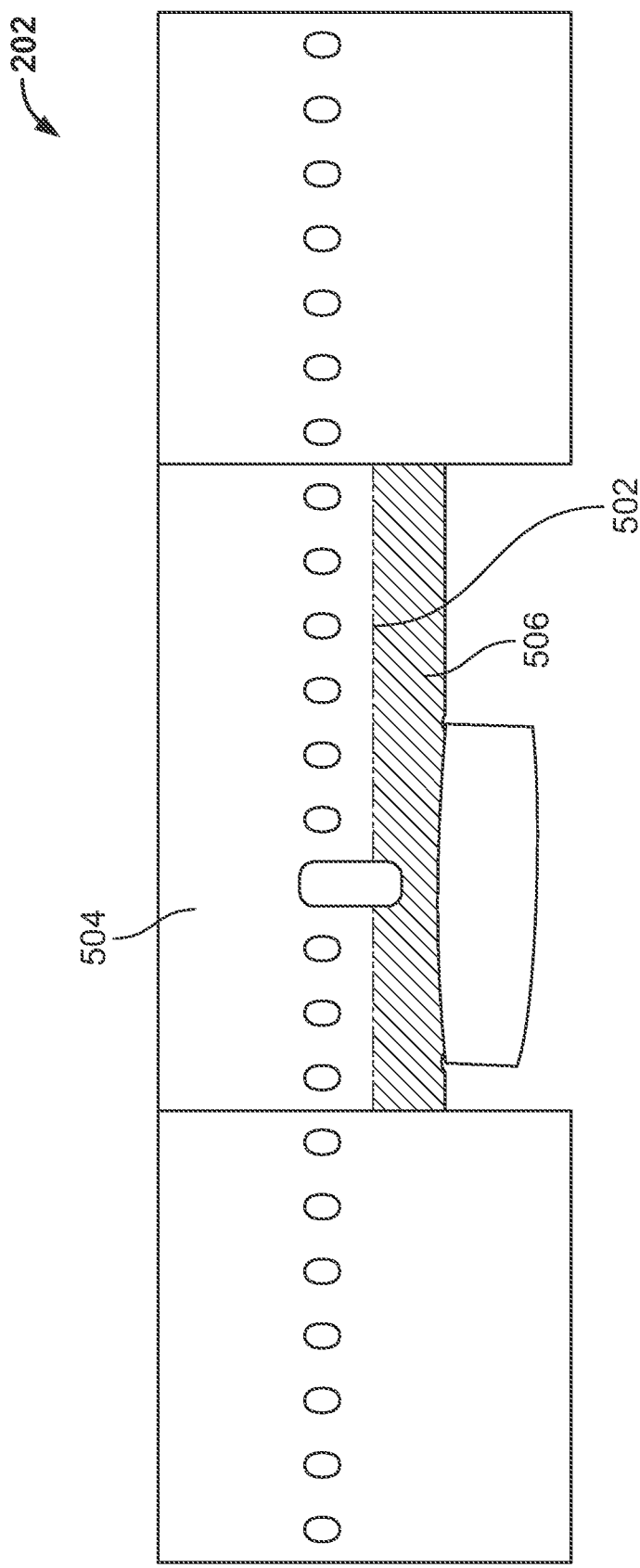
FIGS. 5A-5B illustrate geometries to compare and contrast the example fuselage section of FIGS. 3 and 4B with the known fuselage section of FIGS. 2 and 4A.
Figure 5B:
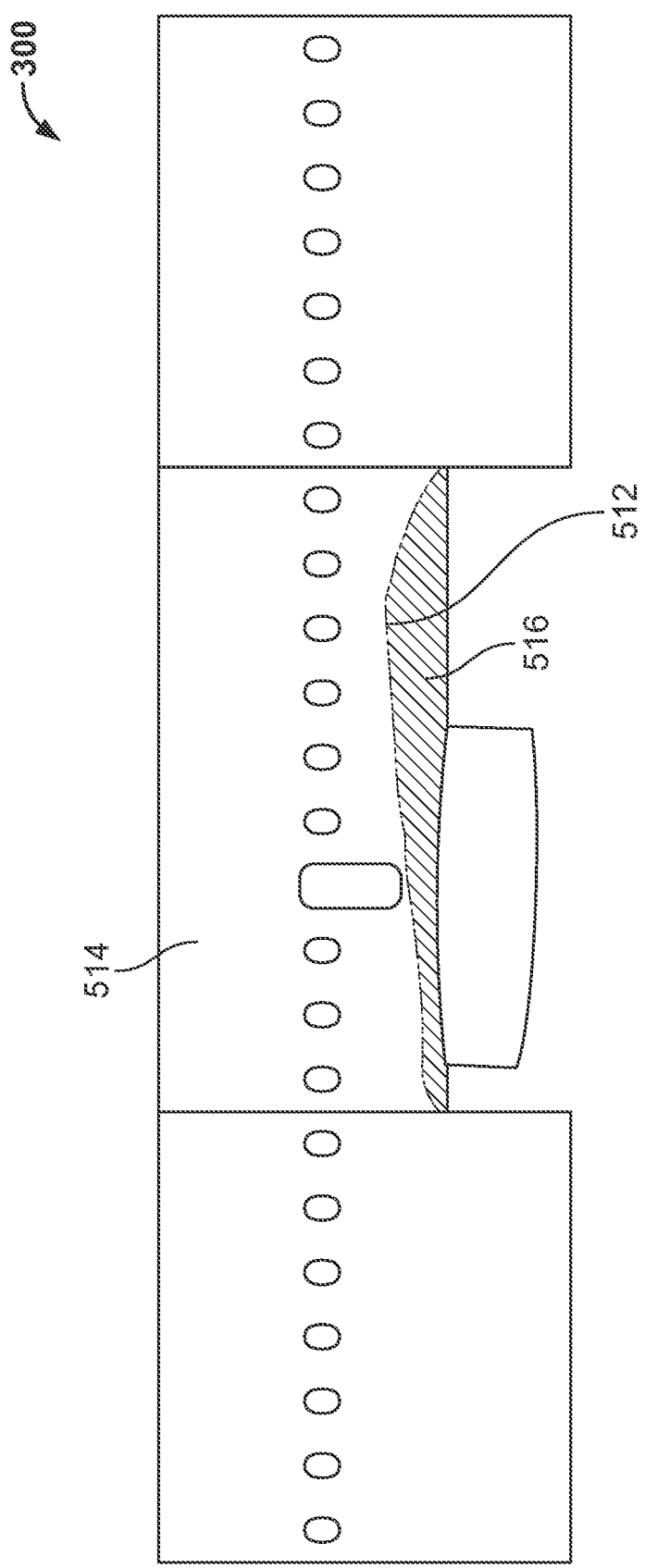

FIGS. 5A and 5B depict side views of the known fuselage section 202 and the example fuselage section 300, respectively. FIG. 5A depicts a transition line 502 that separates a circular section 504 from the relatively flat surface 506. Turning to FIG. 5B, a transition line 512 is shown separating a curved surface (e.g., a blended curved surface or contour) 516 from the surface 514. In contrast to the known transition line 502 of FIG. 5A, the example transition line 512 enables a more significant portion of the fuselage section 300 to exhibit a relatively circular shape, thereby enabling a significantly smoother surface transition of the fuselage section 300 in comparison to that of the known fuselage section 202. In some examples, the taper is approximately 0.8 to 1.4 degrees (e.g., 1.1 degrees).

Figure 6:
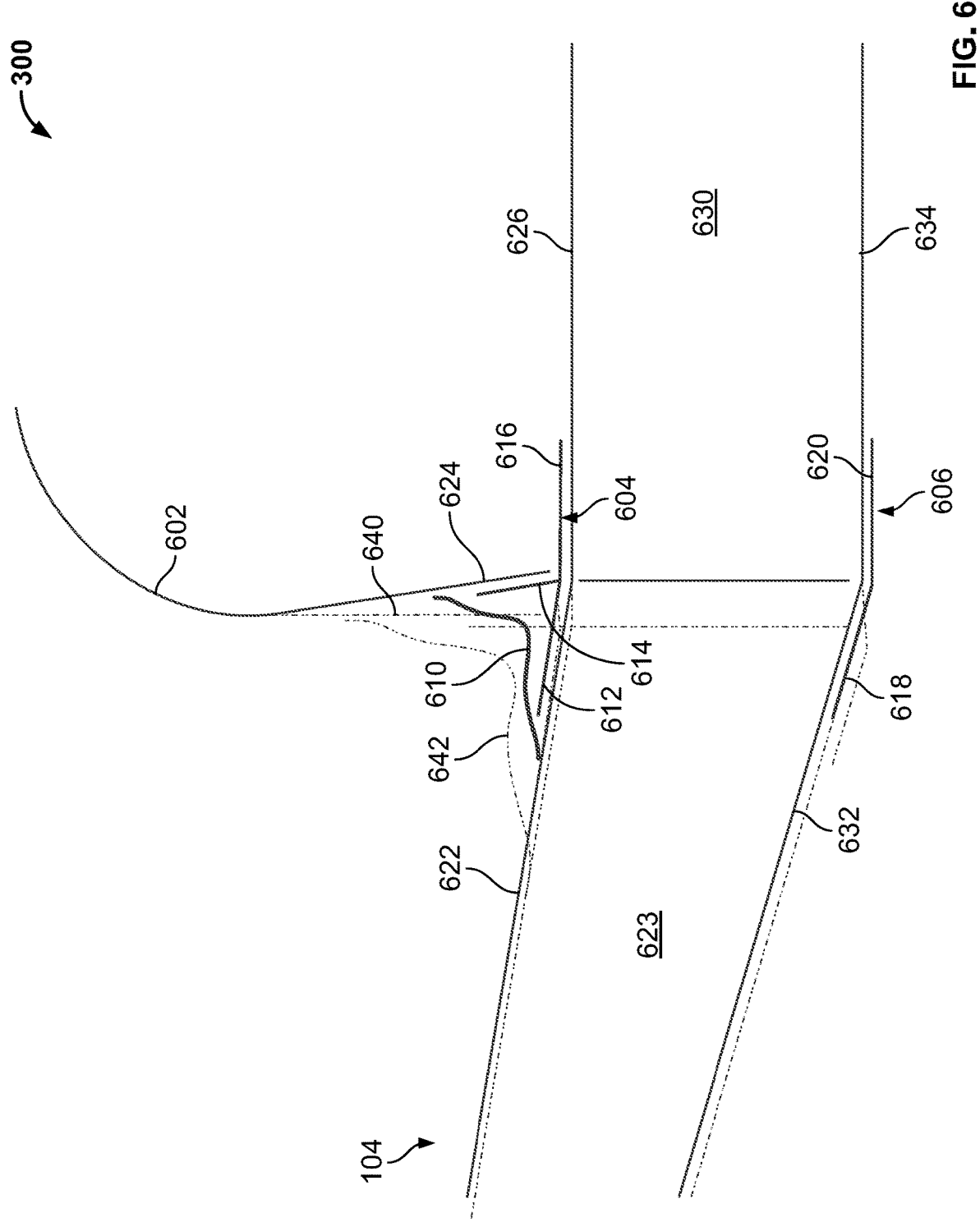
FIG. 6 is frontal view of the example fuselage section of FIGS. 3, 4B and 5B.

FIG. 6 is frontal view of the example fuselage section 300. In the illustrated example, the wing 104 is attached to a fuselage skin 602 via first and second wing splice plates (e.g., wing splice brackets) 604, 606, respectively. In this example, the wing 104 is angled from horizontal and/or the fuselage skin 602 at an acute angle. In other words, the wing 104 is angled upward from the ground on which the aircraft 100 stands. In some examples, a blended contour 610 extends through a space defined between the wing 104 and the fuselage section 300 and/or the fuselage skin 602.

To define the aforementioned acute angle between the wing 104 and the fuselage section 300, the first wing splice plate 604 includes panels 612, 614, 616 and the second wing slice plate 606 includes panels 618, 620. In particular, the panels 612, 614 are angled at an acute angle (e.g., 85 degrees, 45 degrees, etc.) from one another. The example panel 612 supports and/or mounts an upper surface 622 of an outer wing section 623 of the wing 104. Further, the panel 614 supports and/or mounts a lower portion 624 of the fuselage skin 602. In this example, the aforementioned panel 616 supports and/or mounts an upper surface 626 of an inner wing section 630. Similarly, the panel 618 supports and/or mounts a lower surface 632 of the outer wing section 623 while the panel 620 supports and/or mounts a lower surface 634 of the inner wing section 630.

For reference, a dotted line 640 generally represents an outer surface of the known fuselage section 202 described above in connection with FIG. 2. Further, a dotted line 642 generally represents a corresponding blended contour associated with the outer surface of the known fuselage section 202. As can be seen in the illustrated example of FIG. 6, a relative size of the blended contour 610 is significantly reduced in comparison to that of the known fuselage section 202. As a result, a corresponding wing-to body fairing area is reduced in the example fuselage section 300, thereby reducing a drag coefficient, amongst other advantages.

Figure 7:
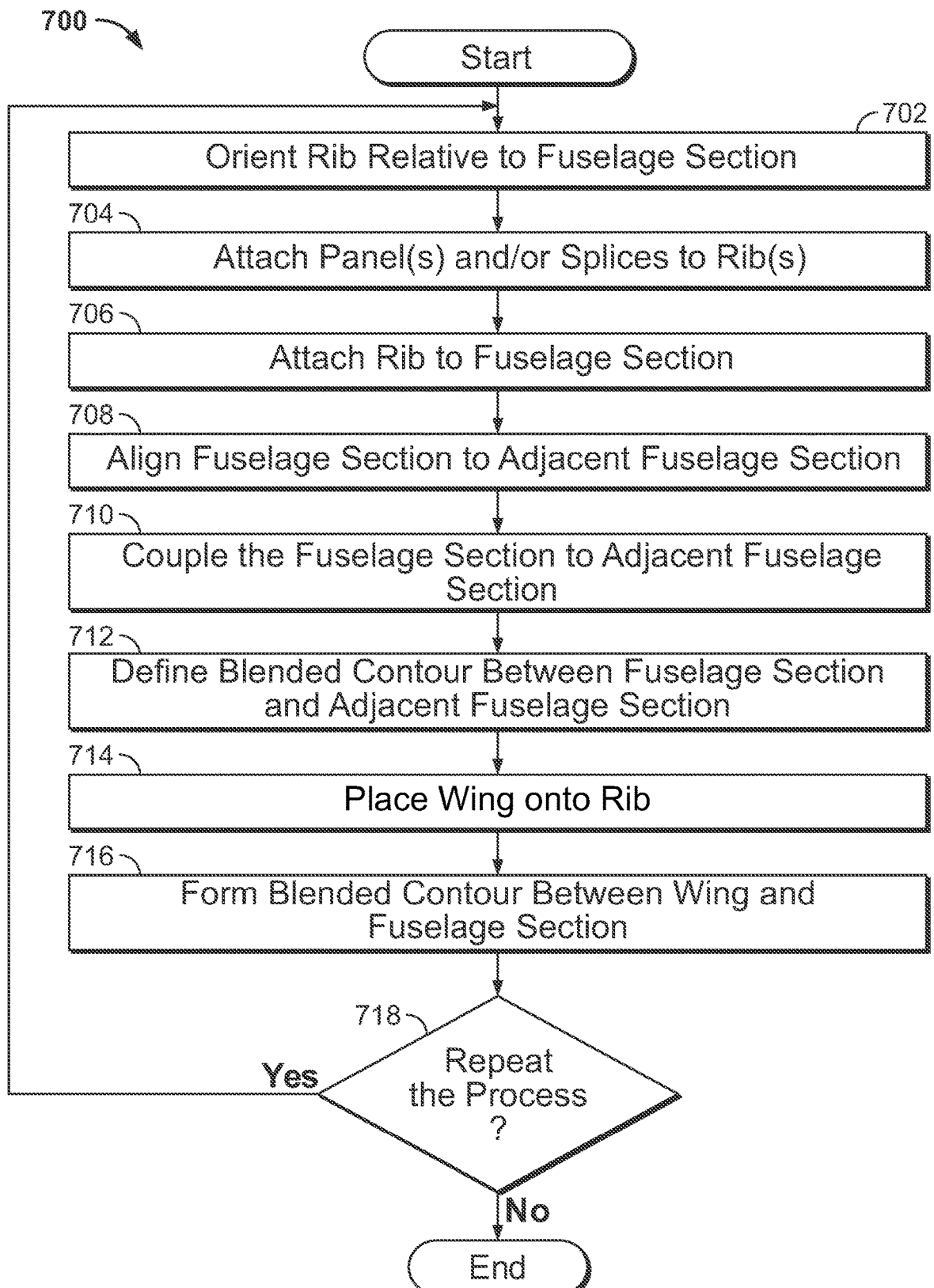
FIG. 7 is a flowchart representative of an example method to produce examples disclosed herein.

FIG. 7 is a flowchart representative of an example method 700 to produce examples disclosed herein. The example method 700 begins as the fuselage section 300 is to be produced and assembled onto the aircraft 100. In the illustrated example, the fuselage section 300 is being produced for later integration/assembly to the fuselage 106.

At block 702, the rib 306 and/or a wing interface surface defined by the rib 306 is oriented relative to the fuselage section 300. In this example, the rib 306 is angled at a taper angle of approximately 1.1 degrees.

At block 704, a skirt panel and/or a stringer splice are attached to the rib 306. In this example, multiple fasteners (e.g., rivets, threaded fasteners, etc.) are used. In some other examples, the skirt panel and/or the stringer splice are attached to the fuselage section 300 prior to being attached to the rib 306.

At block 706, the rib 306 is coupled/attached to the fuselage section 300. In the illustrated example, the rib 306 is attached to the fuselage section 300 by the skirt panel, a flange mount and/or the stringer splice.

At block 708, the example fuselage section 300 is aligned relative to an adjacent fuselage section. In this example, both the fuselage section 300 and the adjacent fuselage section are generally cylindrical in shape.

At block 710, the fuselage section 300 of the illustrated example is coupled to the adjacent fuselage section. In this example, the fuselage section 300 is interspersed between two adjacent fuselage sections.

At block 712, in the illustrated example, the blended contour 610 is formed and/or defined between the fuselage section 300 and the wing 104. In some examples, the blended contour 610 is applied as component and/or assembly. In other examples, the blended contour is applied as an applicant (e.g., a liquid applicant, etc.).

At block 714, the wing 104 and/or a wing box associated with the wing 104 is placed and/or mounted onto the rib 306. In the illustrated example, the wing 104 is oriented based on an orientation or a taper of the rib 306.

At block 716, a blended contour is formed between the wing 104 and the fuselage section 300. In this example, the blended contour is defined in a space defined by an acute angle between the wing 104 and the fuselage section 300.

At block 718, it is then determined whether to repeat the process. If the process is to be repeated (block 718), control of the process returns to block 702. Otherwise, the process ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that enable improved aerodynamics. Examples disclosed herein also enable smaller and/or lighter structural components to be used instead, thereby saving weight and costs associated with typically used components.

Example 1 includes an apparatus having a rib associated with a fuselage section, and a wing interface surface defined by the rib, where the wing interface surface is tapered relative to a longitudinal axis of the fuselage section from an aft end of the fuselage section to a fore end of the fuselage section.

Example 2 includes the apparatus as defined in example 1, further including a blended curved contour of the fuselage section to transition the fuselage section to an adjacent fuselage section.

Example 3 includes the apparatus as defined in any of examples 1 or 2, where the wing interface surface tapers at an angle between approximately example 0.8 degrees to 1.4 degrees from the aft end to the fore end.

Example 4 includes the apparatus as defined in any of examples 1 to 3, where an acute angle is defined in a space between a wing and the fuselage section.

Example 5 includes the apparatus as defined in example 4, further including a blended contour extending across the space between the wing and the fuselage section.

Example 6 includes the apparatus as defined in example 5, where the acute angle is defined by an angled wing splice bracket.

Example 7 includes the apparatus as defined in any of examples 1 to 6, where the wing interface surface tapers from a rear wing spar to a front wing spar.

Example 8 includes a fuselage section of an aircraft having an outer surface to at least partially define an exterior of the aircraft, and a rib to support a wing, where the rib defines a wing interface surface that exhibits a taper, and where the taper is angled inward relative to a longitudinal axis of the fuselage section and angled from an aft end of the fuselage section to a fore end of the fuselage section.

Example 9 includes the fuselage section as defined in example 8, where the wing interface surface tapers at an angle between approximately example 0.8 degrees to 1.4 degrees from the aft end to the fore end.

Example 10 includes the fuselage section as defined in any of examples 8 or 9, where the wing interface surface tapers from a rear wing spar to a front wing spar.

Example 11 includes the fuselage section as defined in example 8, where an acute angle is defined in a space between the wing and the fuselage section.

Example 12 includes the fuselage section as defined in example 11, further including a blended contour extending across the space between the wing and the fuselage section.

Example 13 includes the fuselage section as defined in any of examples 11 or 12, where the acute angle is defined by an angled wing splice bracket.

Example 14 includes the fuselage section as defined in any of examples 8 to 13, further including a blended curved contour to transition the rib to the outer surface of the fuselage section.

Example 15 includes a method of producing a fuselage section includes orienting a rib relative to a longitudinal axis of the fuselage section, where the rib is to be angled from the longitudinal axis to define a tapered wing interface to support a wing, and coupling the rib to the fuselage section.

Example 16 includes the method as defined in example 15, further including coupling the fuselage section to an adjacent fuselage.

Example 17 includes the method as defined in example 16, further including forming a blended contour between the fuselage section and the adjacent fuselage section.

Example 18 includes the method as defined in any of examples 15 to 17, further including coupling a wing to the fuselage section via the rib, where an acute angle is defined between the fuselage section and the wing.

Example 19 includes the method as defined in example 18, where the acute angle is defined by an angled wing splice plate operationally coupled between the wing and the fuselage section.

Example 20 includes the method as defined in any of examples 18 or 19, further including defining a blended contour between the wing and the fuselage section.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in relation to aircraft, examples disclosed herein can be applied to any manned or unmanned vehicles (e.g., watercraft, submarines, unmanned aerial vehicles, etc.).

Examples disclosed herein can implement a modified surface that smoothly blends a monocoque fuselage skin from a wing rib tangentially into the fuselage crown based on an inward taper of rib. As a result, a smooth, tangential transition of a fuselage cross section from a center section of an airplane fuselage to forward and aft adjacent sections is enabled, thereby reducing eliminating abrupt transitions and the resulting cost, weight, labor penalties associated with the abrupt transitions. In some examples, a center fuselage cross section enables an inboard translation of wing-to-fuselage aerodynamic surfaces. This translation can reduce a wetted surface and frontal area of the wing-to-fuselage aerodynamic surfaces, thereby reducing overall airplane drag.

The following claims are hereby incorporated into this Detailed Description by this reference, with each claim standing on its own as a separate embodiment of the present disclosure.

What is claimed is:

1. An apparatus comprising:
  a rib associated with a fuselage section, the fuselage section including a cylindrical shaped portion that is contoured to the rib, the cylindrical shaped portion including:
    a first taper relative to a longitudinal axis of the fuselage section from an aft end of the fuselage section to a fore end of the fuselage section, and
    a second taper angled inward relative to a vertical axis of the fuselage section; and
  a wing interface surface defined by the rib, the wing interface positioned at a converging end of the second taper, the wing interface surface tapered relative to the longitudinal axis of the fuselage section from the aft end of the fuselage section to the fore end of the fuselage section.

2. The apparatus as defined in claim 1, further including a blended curved contour of the fuselage section to transition the fuselage section to an adjacent fuselage section.

3. The apparatus as defined in claim 1, wherein the wing interface surface tapers at an angle between approximately 0.8 degrees to 1.4 degrees from the aft end to the fore end.

4. The apparatus as defined in claim 1, wherein an acute angle is defined in a space between a wing and the fuselage section.

5. The apparatus as defined in claim 4, further including a blended contour extending across the space between the wing and the fuselage section.

6. The apparatus as defined in claim 5, wherein the acute angle is defined by an angled wing splice bracket.

7. The apparatus as defined in claim 1, wherein the wing interface surface tapers from a rear wing spar to a front wing spar.

8. The apparatus of claim 6, wherein the angled wing splice bracket is positioned between the fuselage section and an upper surface of the wing at the second taper.

9. The apparatus of claim 8, wherein the angled wing splice bracket includes:
  a first panel to align the fuselage section at the second taper,
  a second panel to align an outer wing section of the wing at the second taper; and
  a third panel to align an inner wing section of the wing at the second taper.

10. The apparatus of claim 9, wherein the angled wing splice bracket is a first angled wing splice bracket, and further including a second angled wing splice bracket to align the inner wing section relative to the outer wing section at a bottom surface of the wing.

11. The apparatus of claim 8, wherein the blended contour extends between the fuselage section and the upper surface of the wing at the second taper, the angled wing splice bracket separate from the blended contour.

12. A fuselage section of an aircraft, the fuselage section comprising:
  an outer surface to at least partially define an exterior of the aircraft, the outer surface at least partially defined by a cylindrical shaped portion of the fuselage section, the cylindrical shaped portion including:
    a first taper relative to a longitudinal axis of the fuselage section from an aft end of the fuselage section to a fore end of the fuselage section, and
    a second taper angled inward relative to a vertical axis of the fuselage section; and
  a rib to support a wing positioned at a converging end of the second taper, the rib defining a wing interface surface that exhibits a third taper, the third taper angled inward relative to the longitudinal axis of the fuselage section and extending from the aft end of the fuselage section to the fore end of the fuselage section, the cylindrical shaped portion contoured to the rib.

13. The fuselage section as defined in claim 12, wherein the wing interface surface tapers at an angle between approximately 0.8 degrees to 1.4 degrees from the aft end to the fore end.

14. The fuselage section as defined in claim 12, wherein the wing interface surface tapers between from a rear wing spar to a front wing spar.

15. The fuselage section as defined in claim 12, wherein an acute angle is defined in a space between the wing and the fuselage section.

16. The fuselage section as defined in claim 15, further including a blended contour extending across the space between the wing and the fuselage section.

17. The fuselage section as defined in claim 15, wherein the acute angle is defined by an angled wing splice bracket.

18. The fuselage section as defined in claim 12, further including a blended curved contour to transition the rib to the outer surface of the fuselage section.

19. A method of producing a fuselage section, the method comprising:
  orienting a rib relative to a longitudinal axis of the fuselage section, the rib to be angled from the longitudinal axis to define a tapered wing interface at which a wing is to be supported; and
  coupling the rib to the fuselage section, the fuselage section having a cylindrical shaped portion that is contoured to the rib, the cylindrical shaped portion including:
    a first taper relative to the longitudinal axis of the fuselage section from an aft end of the fuselage section to a fore end of the fuselage section, and a second taper angled inward relative to a vertical axis of the fuselage section, wherein the wing is to be coupled to the fuselage section positioned at a converging end of the second taper.

20. The method as defined in claim 19, further including coupling the fuselage section to an adjacent fuselage section.

21. The method as defined in claim 20, further including forming a blended contour between the fuselage section and the adjacent fuselage section.

22. The method as defined in claim 19, further including coupling the wing to the fuselage section via the rib, wherein an acute angle is defined between the fuselage section and the wing.

23. The method as defined in claim 22, wherein the acute angle is defined by an angled wing splice plate operationally coupled between the wing and the fuselage section.

24. The method as defined in claim 22, further including defining a blended contour between the wing and the fuselage section.

* * * * *